(12) United States Patent
Grab et al.

(10) Patent No.: US 12,133,623 B2
(45) Date of Patent: Nov. 5, 2024

(54) SURFACE CLEANING APPARATUS (71) Applicant: BISSELL Inc., Grand Rapids, MI (US)

(72) Inventors: Tyler Grab, Grand Rapids, MI (US); Jason W. Pruiett, Grand Rapids, MI (US); Aaron Griffith, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 17/881,654

(22) Filed: Aug. 5, 2022

(65) Prior Publication Data

US 2023/0063470 A1     Mar. 2, 2023

Related U.S. Application Data

(60) Provisional application No. 63/236,794, filed on Aug. 25, 2021.

(51) Int. Cl.
| | |
|---|---|
| *A47L 9/22* | (2006.01) |
| *A47L 5/30* | (2006.01) |
| *A47L 7/00* | (2006.01) |
| *A47L 9/04* | (2006.01) |
| *A47L 11/30* | (2006.01) |
| *A47L 11/40* | (2006.01) |
| *H02K 5/20* | (2006.01) |
| *H02K 9/06* | (2006.01) |

(52) U.S. Cl.
CPC ............... *A47L 9/22* (2013.01); *A47L 5/30* (2013.01); *A47L 7/0023* (2013.01); *A47L 9/0411* (2013.01); *A47L 9/0477* (2013.01); *A47L 11/302* (2013.01); *A47L 11/4016* (2013.01); *A47L 11/4041* (2013.01); *A47L 11/4069* (2013.01); *A47L 11/4083* (2013.01); *A47L 11/4088* (2013.01); *H02K 5/207* (2021.01); *H02K 9/06* (2013.01); *H02K 2205/09* (2013.01)

(58) Field of Classification Search
CPC . A47L 9/22; A47L 5/30; A47L 7/0023; A47L 9/0411; A47L 9/0477; A47L 11/302; A47L 11/4016; A47L 11/4041; A47L 11/4069; A47L 11/4083; A47L 11/4088; A47L 9/0444; A47L 9/2889; H02K 5/207; H02K 9/06; H02K 2205/09
USPC .......................................................... 15/413
See application file for complete search history.

(56) References Cited

U.S. PATENT DOCUMENTS

| | | | |
|---|---|---|---|
| 5,797,163 A | 8/1998 | Whitaker et al. | |
| 10,092,155 B2 | 10/2018 | Xia et al. | |
| 10,959,590 B2 * | 3/2021 | Moser ................ | A47L 11/201 |
| 2007/0209147 A1 | 9/2007 | Krebs et al. | |

(Continued)

FOREIGN PATENT DOCUMENTS

| | | |
|---|---|---|
| DE | 102015105906 A1 | 10/2016 |
| EP | 2064979 B1 | 6/2009 |

(Continued)

*Primary Examiner* — Brian D Keller
*Assistant Examiner* — Sarah Akyaa Fordjour
(74) *Attorney, Agent, or Firm* — Warner Norcross + Judd LLP (57) ABSTRACT

A surface cleaning apparatus includes a housing having a base adapted for movement across a surface to be cleaned, a fluid delivery system, and a recovery system. Various motor cooling arrangements are disclosed. The surface cleaning apparatus can be configured to clean multiple surfaces, including hard and soft floor surfaces.

23 Claims, 8 Drawing Sheets

(56) References Cited

U.S. PATENT DOCUMENTS

| | | | | |
|---|---|---|---|---|
| 2009/0119871 A1* | 5/2009 | Dilger | .................. | A47L 9/04 |
| | | | | 15/415.1 |
| 2013/0091813 A1* | 4/2013 | Smith | .................. | A47L 9/1625 |
| | | | | 55/342.2 |
| 2015/0257620 A1* | 9/2015 | Salo | .................. | A47L 5/14 |
| | | | | 15/322 |
| 2021/0045611 A1 | 2/2021 | Nguyen | | |
| 2021/0161350 A1 | 6/2021 | Nguyen | | |
| 2021/0186283 A1 | 6/2021 | Nguyen | | |

FOREIGN PATENT DOCUMENTS

| | | |
|---|---|---|
| EP | 3679845 A1 | 7/2020 |
| EP | 3827726 A1 | 6/2021 |
| WO | 2011100678 A2 | 8/2011 |

* cited by examiner

SURFACE CLEANING APPARATUS

CROSS-REFERENCE TO RELATED APPLICATION(S)

This application claims the benefit of U.S. Provisional Patent Application No. 63/236,794, filed Aug. 25, 2021, which is incorporated herein by reference in its entirety.

BACKGROUND

Surface cleaning apparatus for cleaning floors and other surfaces typically include at least one motor, such as a vacuum motor for the source of suction and/or a motor for the agitator. Air may be drawn through the interior of the apparatus in order to cool these motors.

BRIEF SUMMARY

A surface cleaning apparatus is provided herein. In certain embodiments, the surface cleaning apparatus is a multi-surface wet/dry vacuum cleaner that can be used to clean hard floor surfaces such as tile and hardwood and soft floor surfaces such as carpet.

According to one aspect of the disclosure, a surface cleaning apparatus includes a housing comprising a recovery pathway having a dirty inlet and a clean air outlet, a suction source comprising a vacuum motor in fluid communication with the dirty inlet, a vacuum motor cooling pathway comprising a first cooling air inlet in fluid communication with ambient air outside the housing and a cooling air outlet, a brush motor, a brushroll operably coupled to and driven by the brush motor, and a brush motor cooling pathway comprising a second cooling air inlet in fluid communication with ambient air outside the housing, wherein the brush motor cooling pathway merges with the vacuum motor cooling pathway upstream of the cooling air outlet, such that heated cooling air from the brush motor and the vacuum motor merges within the vacuum motor cooling pathway and is exhausted together through the cooling air outlet, and wherein the brush motor cooling pathway is isolated from the recovery pathway.

According to another aspect of the disclosure, a surface cleaning apparatus includes a housing with a recovery pathway having a dirty inlet and a clean air outlet, a suction source comprising a first motor in fluid communication with the dirty inlet, a first motor cooling pathway including a first cooling air inlet in fluid communication with ambient air outside the housing and a cooling air outlet, a second motor, and a second motor cooling pathway including a second cooling air inlet in fluid communication with ambient air outside the housing, wherein the second motor cooling pathway merges with the first motor cooling pathway upstream of the cooling air outlet, such that heated cooling air from the first and second motors merges within the first motor cooling pathway and is exhausted together through the cooling air outlet, and wherein the second motor cooling pathway is isolated from the recovery pathway.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF EMBODIMENTS OF THE INVENTION

The invention generally relates to a surface cleaning apparatus for cleaning floor surfaces such as carpets, area rugs, wood, tile, and the like, and arrangements for routing motor cooling air though such apparatus.

Figure 1:
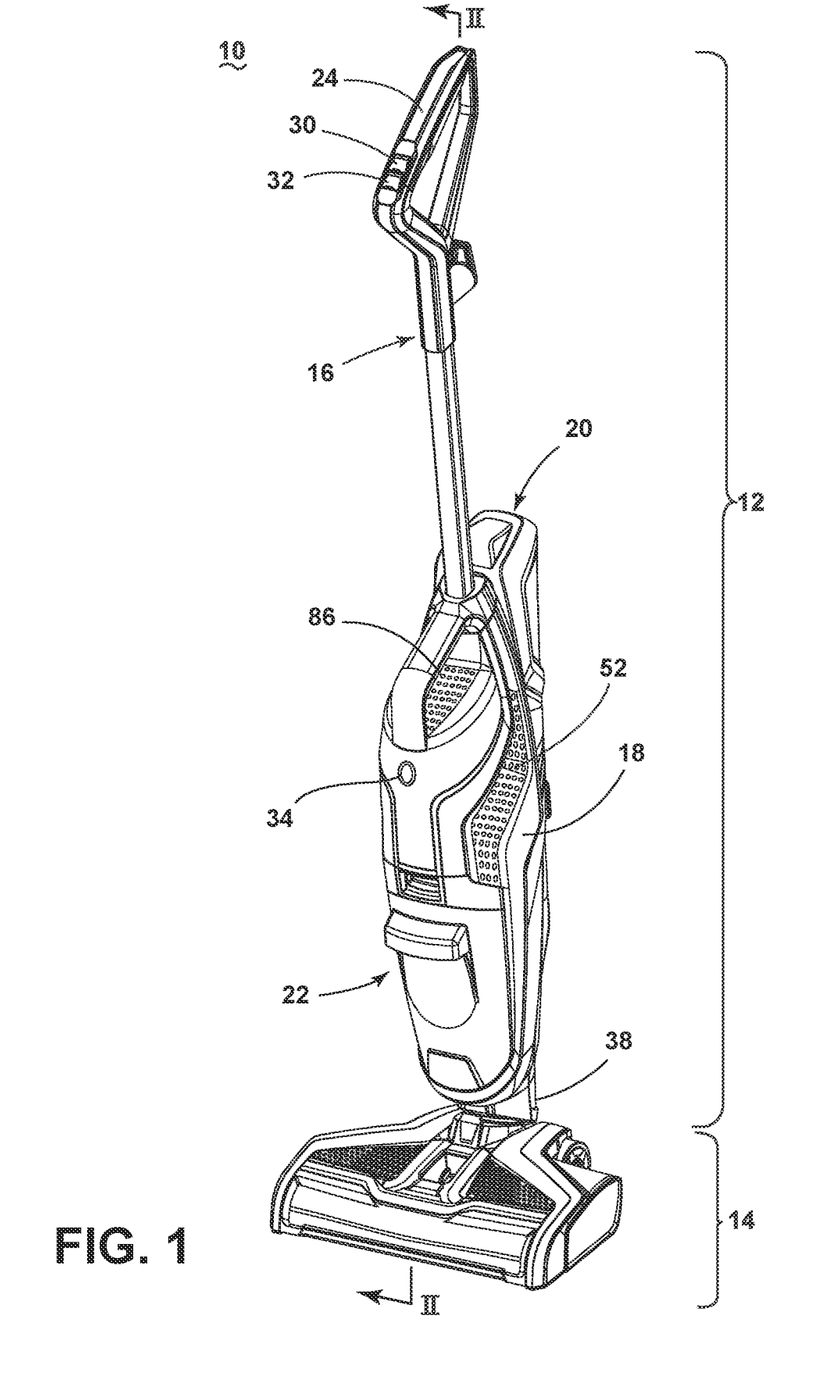
FIG. 1 is a perspective view of a surface cleaning apparatus having a base according to one embodiment of the disclosure.
Figure 2:
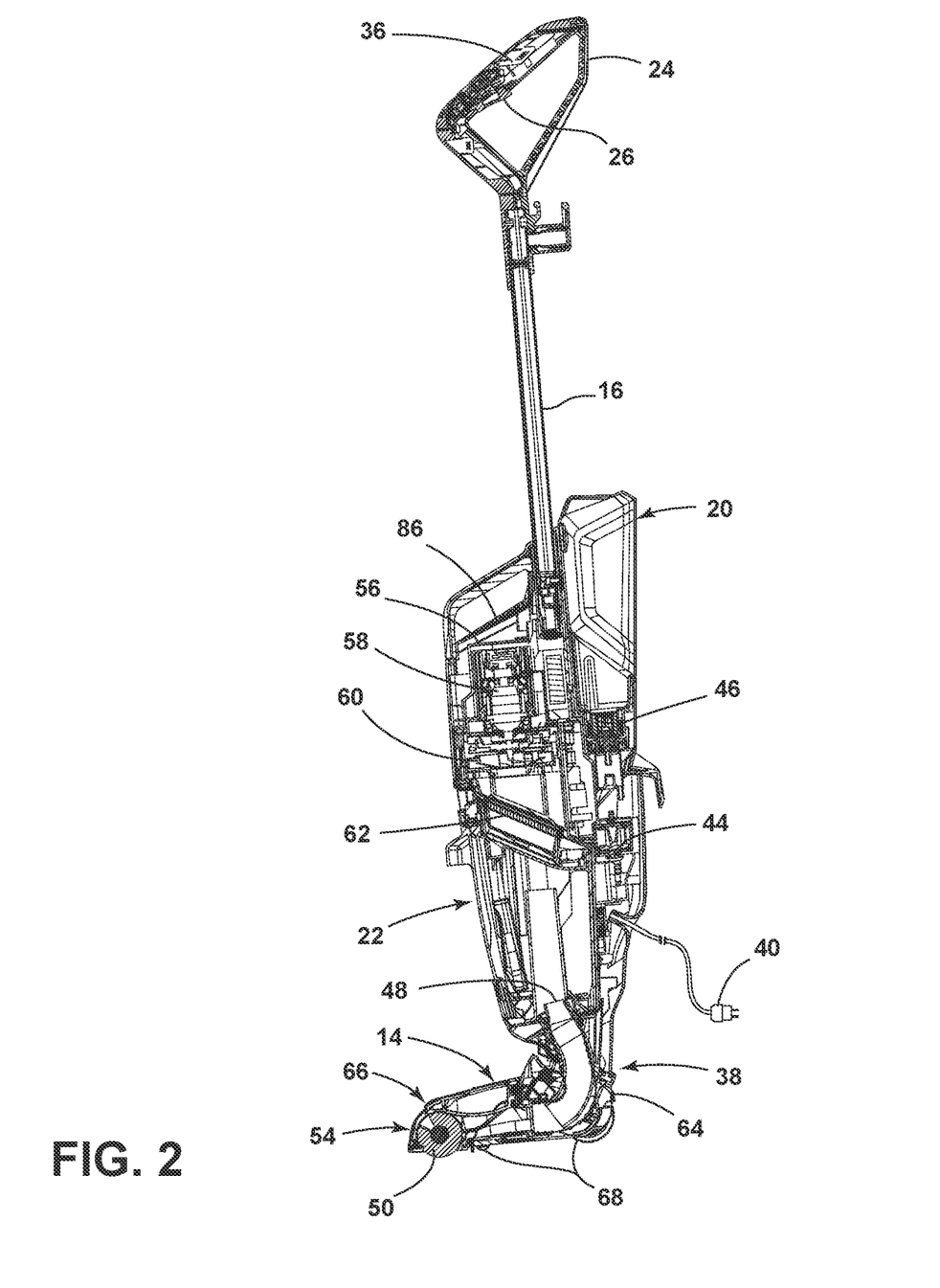
FIG. 2 is a cross-sectional view of the surface cleaning apparatus taken through line II-II of FIG. 1.

FIGS. 1-2 show a surface cleaning apparatus 10 according to one aspect of the present disclosure. As discussed in further detail below, the surface cleaning apparatus 10 is provided with improved motor cooling routing.

The functional systems of the apparatus 10 can be arranged into any desired configuration, such as an upright device having a base and an upright body for directing the base across the surface to be cleaned, a canister device having a cleaning implement connected to a wheeled base by a vacuum hose, a portable device adapted to be hand carried by a user for cleaning relatively small areas, or a commercial device. Any of the aforementioned cleaners can be adapted to include a flexible vacuum hose, which can form a portion of the working air conduit between a nozzle and the suction source.

As illustrated herein, the apparatus 10 can be an upright multi-surface wet/dry vacuum cleaner having a housing that includes an upright handle assembly or body 12 and a cleaning head or base 14 mounted to or coupled with the upright body 12 and adapted for movement across a surface to be cleaned. As used herein, the term "multi-surface wet/dry vacuum cleaner" includes a vacuum cleaner that can be used to clean hard floor surfaces such as tile and hardwood and soft floor surfaces such as carpets and area rugs.

For purposes of description related to the figures, the terms "upper," "lower," "right," "left," "rear," "front," "vertical," "horizontal," "inner," "outer," and derivatives thereof shall relate to the disclosure as oriented in FIG. 1 from the perspective of a user behind the apparatus 10, which defines the rear of the apparatus 10. However, it is to be understood that the disclosure may assume various alternative orientations, except where expressly specified to the contrary.

The upright body 12 can comprise a handle 16 and a frame 18. The frame 18 can comprise a main support section supporting at least a supply tank 20 and a recovery tank 22, and may further support additional components of the body 12. The surface cleaning apparatus 10 can include a fluid delivery or supply pathway, including and at least partially defined by the supply tank 20, for storing cleaning fluid and delivering the cleaning fluid to the surface to be cleaned and a recovery pathway, including and at least partially defined by the recovery tank 22, for removing the spent cleaning fluid and debris from the surface to be cleaned and storing the spent cleaning fluid and debris until emptied by the user.

The handle 16 can include a hand grip 24 and a trigger 26 mounted to the hand grip 24, the trigger 26 controlling the dispensing of fluid from a fluid delivery system including the supply tank 20 via an electronic or mechanical coupling with the tank 20. Other actuators for the fluid delivery system, such as a thumb switch, can be provided instead of the trigger 26.

The apparatus 10 can include at least one user interface (UI) through which a user can interact with the apparatus 10 and/or receive feedback information from the apparatus 10. The UI can be electrically coupled with electrical components, including, but not limited to, circuitry electrically connected to various components of the fluid delivery and recovery systems of the surface cleaning apparatus 10, as described in further detail below.

In the illustrated embodiment, the apparatus 10 includes a UI with multiple input controls 30, 32 on the hand grip 24. One control 30 is a power button that controls the supply of power to one or more electrical components of the apparatus 10 and the other control 32 is a cleaning mode button that cycles the apparatus 10 between different cleaning modes. Some examples of cleaning modes include a hard floor cleaning mode and an area rug or carpet cleaning mode. In one example, in each cleaning mode a pump 44, vacuum motor 58, and brush motor 72 are activated, with the vacuum motor operating at a lower power level and the pump operating at a lower flow rate in the hard floor mode. Those rates increase in the area rug cleaning mode. Other cleaning modes are possible. Other input controls, such as but not limited to buttons, triggers, toggles, keys, switches, or the like, and other locations for the UI are possible.

The apparatus 10 can include a self-cleaning mode input control 34, which initiates a self-cleaning mode of operation in which an unattended, automatic self-cleaning cycle runs. In one example, during the self-cleaning cycle, the apparatus 10 is docked on a tray and the pump 44, vacuum motor 58, and/or brush motor 72 operate to flush out portions of the recovery pathway of the recovery system and clean a brushroll 50 or other agitator. The input control 34 can comprise a button, trigger, toggle, key, switch, or the like, or any combination thereof, and can be located adjacent to the power button 30 and/or cleaning mode button 32, or can be remote from the buttons 30, 32 as shown. For example, the self-cleaning mode input control 34 can be located on the upright body 12, or more specifically on the handle 16 or frame 18.

The apparatus 10 can include a controller 36 operably coupled with the various functional systems of the apparatus, including, but not limited to, the fluid delivery and recovery systems, for controlling its operation. A user of the apparatus 10 can interact with the controller 36 via the UI and/or buttons 30, 32, and 34. The controller 36 can further be configured to execute the self-cleaning cycle for the self-cleaning mode of operation. The controller 36 can have software for executing the self-cleaning cycle. In the embodiment shown in FIG. 2, the controller 36 is disposed inside the hand grip 24, although other locations are possible.

Figure 5:
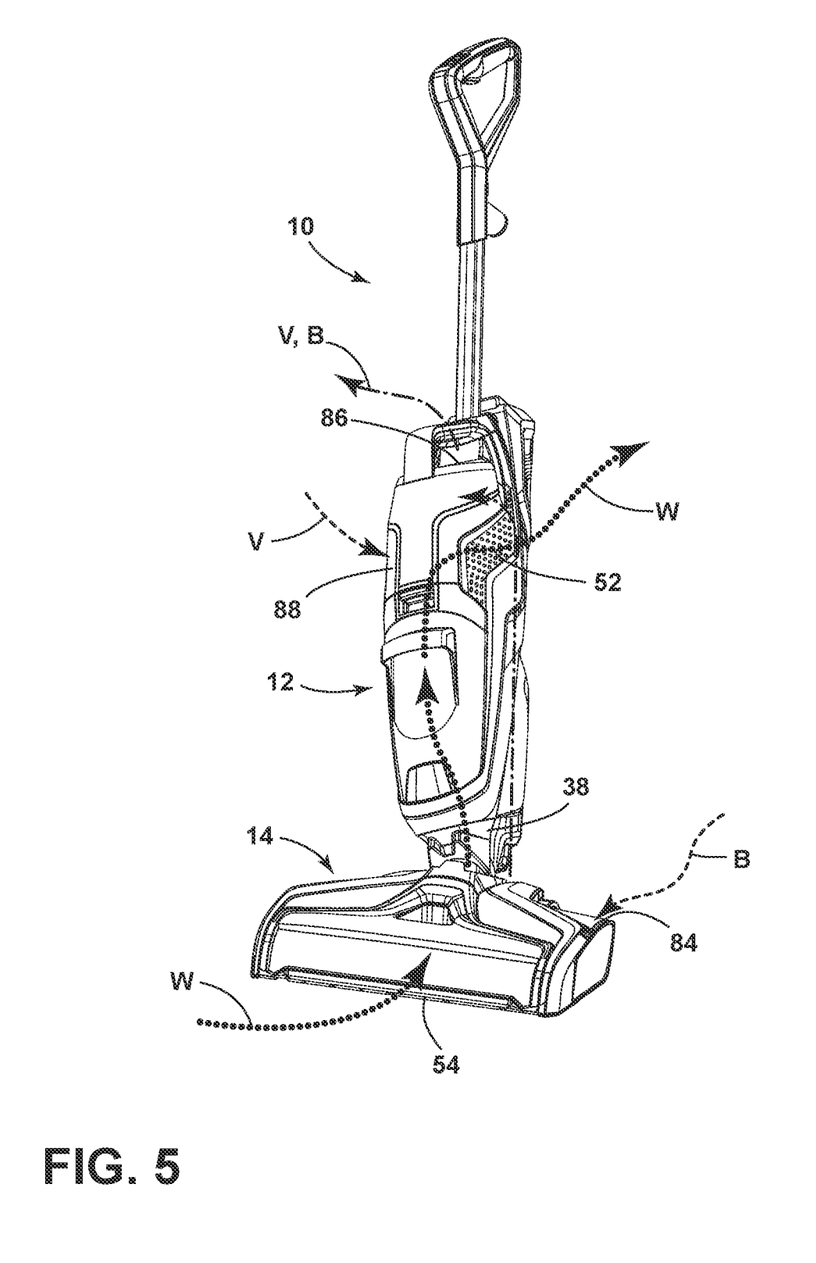
FIG. 5 is a perspective view of the surface cleaning apparatus of FIG. 1 showing flow pathways for working air, brush motor cooling air, and vacuum motor cooling air.

A moveable joint assembly 38 can be formed at a lower end of the frame 18 and moveably mounts the base 14 to the upright body 12. In the embodiment shown herein, the upright body 12 can pivot up and down about at least one axis relative to the base 14. The joint assembly 38 can alternatively comprise a universal joint, such that the upright body 12 can pivot about at least two axes relative to the base 14. Wiring and/or conduits can optionally supply electricity, air and/or liquid (or other fluids) between the base 14 and the upright body 12, or vice versa, and can extend though the joint assembly 38. The upright body 12 can pivot, via the joint assembly 38, to an upright or storage position, an example of which is shown in FIGS. 1-2, and a reclined or use position, an example of which is shown in FIG. 5, in which the upright body 12 is pivoted rearwardly relative to the base 14 to form an acute angle with the surface to be cleaned. In this position, a user can partially support the apparatus by holding the hand grip 24.

The apparatus 10 can be powered by a power supply, such as a power cord 40 plugged into a household power outlet. In yet another embodiment, the apparatus 10 can be powered by a battery, preferably a rechargeable battery, for cordless operation.

The fluid delivery system of the apparatus 10 is configured to deliver cleaning fluid from the supply tank 20 to a surface to be cleaned, and can include a fluid delivery or supply pathway. The supply tank 20 includes a supply chamber for holding cleaning fluid. The cleaning fluid can comprise one or more of any suitable cleaning liquids, including, but not limited to, water, compositions, concentrated detergent, diluted detergent, etc., and mixtures thereof. For example, the liquid can comprise a mixture of water and concentrated detergent. Alternatively, supply tank 20 can include multiple supply chambers, such as one chamber containing water and another chamber containing a cleaning agent. As yet another alternative, the apparatus 10 can comprise multiple supply tanks. It is noted that while the apparatus 10 described herein is configured to deliver a cleaning liquid, aspects of the disclosure may be applicable to floor cleaner that deliver steam. Thus, the term "cleaning fluid" may encompass both liquid and steam unless otherwise noted.

The fluid delivery system can comprise a flow control system for controlling the flow of cleaning fluid from the supply tank 20 to a distributor 42 (FIG. 4) configured to distribute or dispense the fluid. In one configuration, the flow control system can comprise the pump 44, which pressurizes the system. The pump 44 can be positioned within the upright body 12 or within the base 14, and is in fluid communication with the supply tank 20, for example via conduit (not shown). In another configuration, the pump 44 can be eliminated and the flow control system can comprise a gravity-feed system having a valve fluidly coupled with an outlet of the supply tank 20, whereby when valve is open, cleaning fluid will flow under the force of gravity to the distributor 42.

The fluid delivery system can include a supply valve 46 controlling fluid flow from an outlet of the supply tank 20 to the pump 44. For a removable supply tank 20, the supply valve 46 can be configured to automatically open when the supply tank 20 is seated apparatus 10 to release fluid to the fluid delivery pathway.

The trigger 26 can be operably coupled with the flow control system such that pressing the trigger 26 will deliver cleaning fluid to the distributor 42. For example, the delivery system can include a valve (not shown) in the fluid pathway extending between the pump 44 and the distributor 42, and the trigger 26 can selectively open the valve to permit fluid to flow out of the distributor 42.

Optionally, a heater (not shown) can be provided for heating the cleaning fluid prior to delivering the cleaning fluid to the surface to be cleaned. In one example, an in-line heater can be located downstream of the supply tank 20 and the pump 44. Other types of heaters can also be used. In yet another example, the cleaning fluid can be heated using exhaust air from a motor-cooling pathway.

The recovery system is configured to remove liquid and debris from the surface to be cleaned and store the liquid and debris on the floor cleaner 10 for later disposal, and can include a recovery pathway having at least a dirty inlet and a clean air outlet. The pathway can be formed by, among other elements, a suction nozzle 54 defining the dirty inlet, a suction source 56 in fluid communication with the suction nozzle 54 for generating a working air stream, the recovery tank 22, and at least one exhaust vent 52 defining the clean air outlet. At least a portion of the recovery pathway between the suction nozzle 54 and the tank 22 can be formed by a conduit 48 extending through the joint assembly 38, from the base 14 to the upper unit 12. A brushroll 50 is disposed in the recovery pathway at the suction nozzle 54. Other arrangements for the recovery pathway are possible.

The recovery tank 22 is a working air treatment assembly, and removes liquid and debris from the working airstream and collects the liquid and debris for later disposal. It is understood that other types of working air treatment assemblies for removing and collecting debris and/or liquid from the working airstream for later disposal can be used, such as a cyclonic separator, a centrifugal separator, a bulk separator, a filter bag, or a water-bath separator. The type of working air treatment assembly may depend on the type of floor cleaner, whether the apparatus performs dry cleaning, wet cleaning, or both, and so on.

The suction nozzle 54 can be provided on the base 14 and is adapted to be adjacent the surface to be cleaned as the base 14 moves across a surface, and is in fluid communication with the recovery tank 22, for example through conduit 48.

A brushroll 50 can be disposed in suction nozzle 54, and therefore in the recovery pathway, with the brushroll 50 agitating the surface to be cleaned so that the debris is more easily ingested into the suction nozzle 54. The suction nozzle 54 positioned to recover liquid and debris indirectly from the floor surface via the brushroll 50. In other embodiments, the brushroll 50 can be outside the recovery pathway, for example to mop the floor surface, with the suction nozzle 54 positioned to recover liquid and debris directly from the floor surface.

While a single horizontally-rotating brushroll 50 is shown herein, in some embodiments, dual horizontally-rotating brushrolls or one or more vertically-rotating brushrolls can be provided on the apparatus 10.

The suction source 56, which can be a motor/fan assembly including a vacuum motor 58 and a vacuum fan 60, is provided in fluid communication with the recovery tank 22. The suction source 56 can be positioned within the frame 18, such as above the recovery tank 22, and is fluidly downstream of the recovery tank 22. The recovery system can also be provided with one or more additional filters upstream or downstream of the suction source 56. For example, in the illustrated embodiment, a pre-motor filter 62 is provided in the recovery pathway downstream of the recovery tank 22 and upstream of the suction source 56. A post-motor filter (not shown) can be provided in the recovery pathway downstream of the suction source 56 and upstream of the clean air outlet 52.

Figure 3:
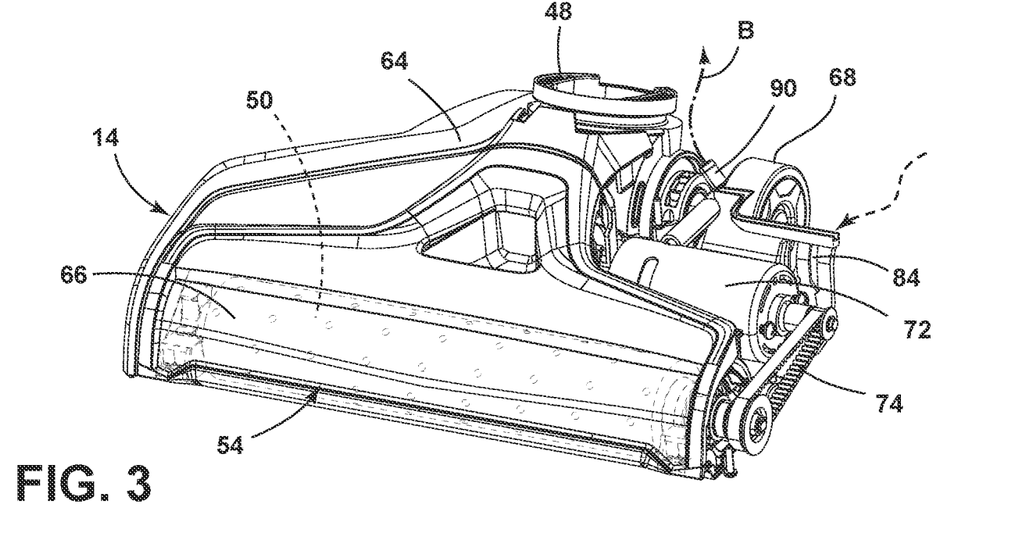
FIG. 3 is a perspective view of the base of FIG. 1, with portion of the base hidden to show internal details of the base.
Figure 4:
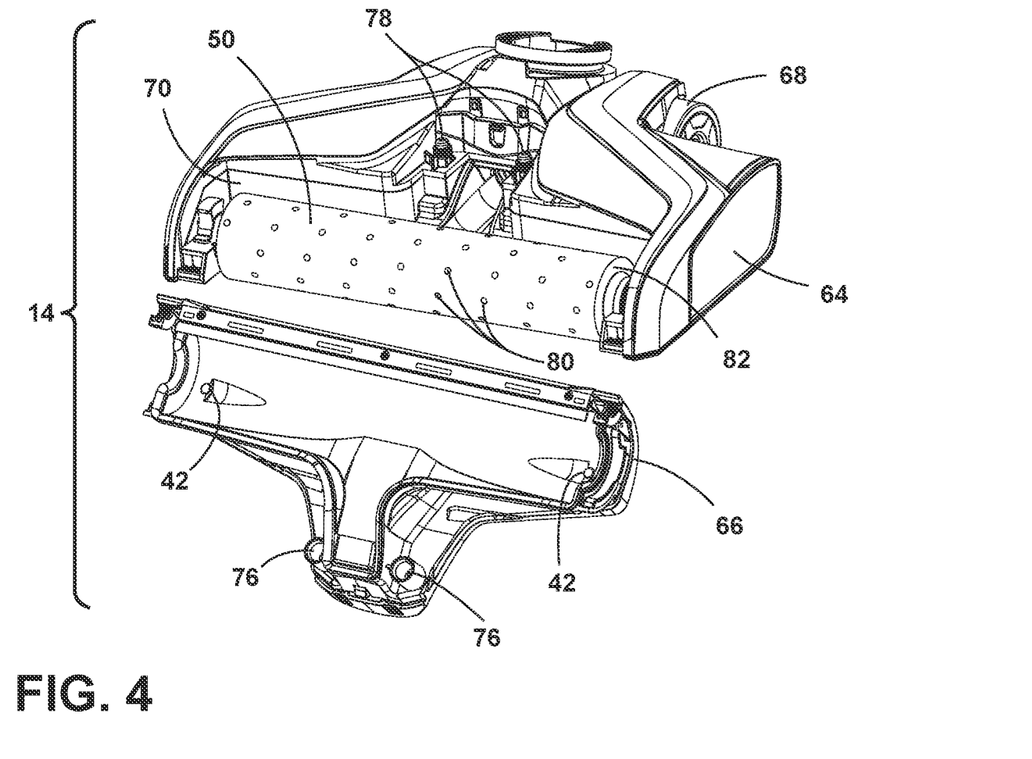
FIG. 4 is a perspective view of the base, showing a nozzle cover removed from a base housing.

Referring to FIGS. 3-4, the base 14 can include a base housing 64 supporting at least some of the components of the fluid delivery system and fluid recovery system and the suction nozzle 54 can comprise a nozzle cover 66 coupled with the base housing 64. Optionally, the base housing 64 includes one or more wheels 68 for moving the apparatus 10 over the surface to be cleaned.

The brushroll 50 is positioned in a brushroll chamber 70, which may be formed by the base housing 64 and the nozzle cover 66, and/or another portion of the base 14, with the nozzle cover 66. The brushroll 50 can be operably coupled to and driven by a drive assembly 74 including a brush motor 72 in the base 14. The coupling between the brushroll 50 and the brush motor 72 can comprise one or more belts, gears, shafts, pulleys or combinations thereof. In FIG. 3, a portion of the base 14 is removed so that the motor 72 and drive assembly 74 is visible. Alternatively, the vacuum motor 58 (FIG. 2) can provide both vacuum suction and brushroll rotation.

As shown in FIG. 4, the nozzle cover 66 can be removable from the base housing 64 to access the brushroll 50, which can be removable from the brushroll chamber 70 for cleaning, drying, and/or replacement. In other embodiments, the brushroll 50 and chamber 70 can be configured so that prior removal of a nozzle cover is not required, such as by having the brushroll 50 removable through lateral side of the base 14 or from the underside of the base 14.

The distributor 42 for the delivery system can include one or more spray tips on the base 14, and can be positioned to deliver cleaning fluid to the brushroll 50, thereby indirectly providing cleaning fluid to the floor surface, or can be positioned to deliver cleaning fluid directly to the floor surface. In the embodiment shown, the spray tips 42 are provided on an interior or brush-facing side of the nozzle cover 66. The spray tips 42 can be fed via channels of the cover 66, which terminate in connector ports 76 that couple with spray connectors 78 on the base housing 64 when the cover 66 is installed on the base housing 64. The spray connectors 78, in turn, are supplied with cleaning fluid via the pump 44 (FIG. 2) or other flow control system of the apparatus 10. The spray tips 42 can optionally be oriented to spray fluid inwardly onto the brushroll 50.

Other embodiments of fluid distributors are possible, such as a spray manifold having multiple outlets or a spray nozzle configured to spray cleaning fluid outwardly from the base 14 in front of the surface cleaning apparatus 10.

The brushroll 50 can be a hybrid brushroll suitable for use on both hard and soft surfaces, and for wet or dry cleaning. In one embodiment, the brushroll 50 comprises a brush bar (not shown) supporting at least one agitation element 80, 82. In one embodiment, the agitation element can comprise a plurality of bristles 80 and microfiber material 82 provided on the brush bar, with the microfiber material 82 arranged between the bristles 80. Bristles 80 can be tufted or unitary bristle strips and constructed of nylon, or any other suitable synthetic or natural fiber. The microfiber material 82 can be constructed of polyester, polyamides, or a conjugation of materials including polypropylene or any other suitable material known in the art from which to construct microfiber.

Motor cooling air can be provided to cool the vacuum motor 58 and/or the brush motor 72. The motor cooling air paths supply cooling air to the motors 58, 72 and remove heated cooling air (also referred to herein as "heated air") from the motors 58, 72. FIG. 5 shows one embodiment of flow pathways for working air, brush motor cooling air, and vacuum motor cooling air through the apparatus 10. As shown by dashed line W, working air generally flows in through the suction nozzle 54 and is exhausted through vents 52. Brush motor cooling air can flow in through a cooling air inlet 84 (see FIG. 3) in the base 14, passes through the brush motor 72, and out through at least one cooling air outlet 86 in the upright body 12, as shown by dashed line B. Vacuum motor cooling air can flow in through a cooling air inlet 88 in the upright body 12, passes through the vacuum motor 58, and out through at least one cooling air outlet 86 in the upright body 12, as shown by dashed line V. The cooling air inlets and outlets 84, 86, 88 are in fluid communication with the ambient air outside the apparatus 10.

As will be described in further detail below, the brush motor cooling flow path B can merge with the vacuum motor cooling flow path V in the upright body 12, such that the flow paths B, V share a common cooling air outlet 86. In some embodiments, the cooling air outlet 86 can be formed by a vent in the upright body 12, such as by a vent on an upper side of the frame 18.

The cooling air inlet 88 for the vacuum motor cooling flow path V can be formed by at least one leak area intentionally formed in the upright body 12 between parts forming the exterior casing of the apparatus 10 in locations where the cooling air can reach the vacuum motor. Multiple leak areas can be intentionally formed in the upright body 12, and can be inconspicuous or hidden so that they are not obvious to a user from the exterior of the body 12. In FIG. 5, one such leak area is indicated with reference numeral 88, although it understood that multiple leak areas form the cooling air inlet 88 for the illustrated embodiment. In other embodiments of the apparatus 10, the cooling air inlet 88 can be formed by one or more vents in the upright body 12 that are obvious to a user from the exterior of the apparatus 10.

Portions of the working air flow path W (also referred to herein as the recovery pathway) and brush motor cooling flow path B can extend through the joint assembly 38. The working air flow path W can extend through the conduit 48 (FIG. 2-3) as previously described. The brush motor cooling flow path B can include a conduit 90 (a portion of which is shown in FIG. 3) carrying heated air from the brush motor 72 to the suction source 56, as described in further detail below. The conduit 90 can comprise a flexible hose or tubing which will flex as the joint assembly 38 is articulated. The conduit 90 can be made up of one or more sections of hose, tubing, conduits, or ducts. In other embodiments, either of the conduits 48, 90 can extend alongside and exterior of the joint assembly 38, rather than through the joint assembly.

Figure 6:
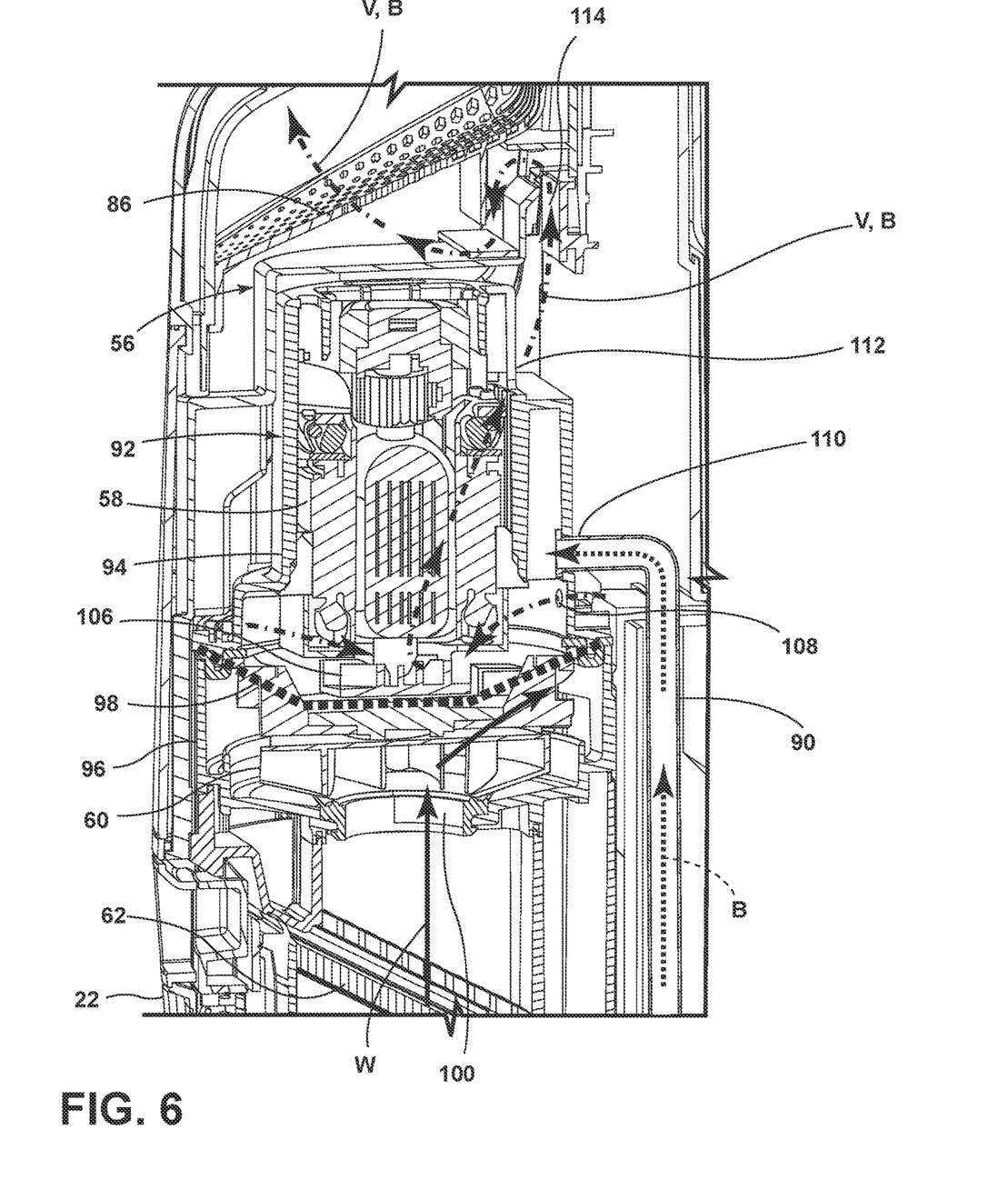
FIG. 6 is an enlarged cross-sectional view taken through line II-II of FIG. 1, showing portions of a working air path and a motor cooling air path of the apparatus.

Referring to FIG. 6, portions of the working air flow path W and the motor cooling air paths V, B through the suction source 56 are shown. The suction source 56 is arranged within an enclosure 92 that includes a motor housing 94 enclosing the vacuum motor 58 and a fan housing 96 enclosing the fan 60. Generally, the working air flow path W extends through the fan housing 96 and the motor cooling air paths V, B extend though the motor housing 94. A seal 98 can be provided between the housings 94, 96 to seal off the working air flow path W from the motor cooling air paths V, B. The seal 98 can thereby define a motor-side of the enclosure 92 and a fan-side of the enclosure 92.

The fan housing 96 includes at least one fan intake 100 for drawing working air into a fan chamber defined by the fan housing 96 in which the fan 60 is disposed. The fan intake 100 can be in fluid communication with an air outlet of the recovery tank 22, and can receive working air that has been filtered by the pre-motor filter 62. The fan housing 96 further includes at least one fan outlet (not shown) through which air is driven from the chamber by the fan 60. The fan outlet (not shown) is in fluid communication with the vents 52 to exhaust working air from the apparatus 10.

The motor housing 94 can enclose a cooling fan 106. The cooling fan 106 is operably coupled with the vacuum motor 58 and draws cooling air through the vacuum motor cooling air path V and through the brush motor cooling air path B.

The motor housing 94 includes at least one motor intake 108 for allowing cooling air for the vacuum motor 58 to be drawn into the housing 94 by the cooling fan 106. The motor intake 108 is in fluid communication with the cooling air inlet 88, e.g. with the multiple leak areas in the upright body 12 for the embodiment shown.

The brush motor cooling flow path B can merge with the vacuum motor cooling flow path V in the upright body 12 and share a common cooling air outlet 86, as well as a common cooling fan 106. The conduit 90, which can be made up of one or more sections of hose, tubing, conduits, or ducts, can fluidly communicate with the enclosure 92 on the motor-side of the seal 98. An outlet end 110 of the conduit 90 can, for example, fluidly couple with the motor housing 94 to port the heated air from cooling the brush motor 72 into the motor-side of the enclosure 92. Through this connection, the brush motor cooling flow path B can join the vacuum motor cooling air path V within the enclosure 92.

The cooling fan 106 draws cooling air through the brush motor cooling air path B via cooling air inlet 84 (see FIG. 3) in the base 14 and through the vacuum motor cooling air path V. From the inlet 84, motor cooling air flows over the brush motor 72. Heat from the motor 72 transfers to the motor cooling air. The brush motor 72 can include a motor housing enclosing the brush motor 72, with the motor cooling air passing through the housing to cool the motor 72. Heated air from the brush motor 72 passes through conduit 90 and into the enclosure 92 to merge with the cooling air in the vacuum motor cooling flow path V.

In the motor housing 94, motor cooling air passes flows over the vacuum motor 58. The cooling air includes a mixture of cool, ambient air drawn in through the cooling air inlet 88 and heated air that has already flowed over the brush motor 72. Heat from the vacuum motor 58 transfers to the motor cooling air. The motor housing 94 also includes at least one motor exhaust opening 112 through which heated cooling air is exhausted. The exhaust opening 112 is in fluid communication with the common air outlet 86, such as via an at least one exhaust duct 114, to exhaust heated motor cooling air from the apparatus 10.

Figure 7:
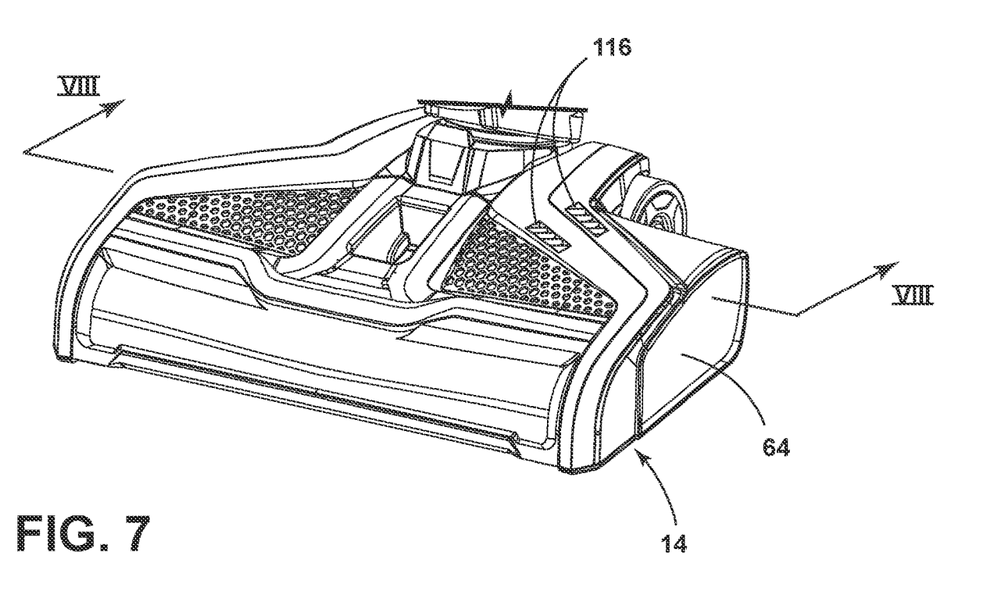
FIG. 7 is a perspective view of the base showing an alternate embodiment of a brush motor cooling air path.
Figure 8:
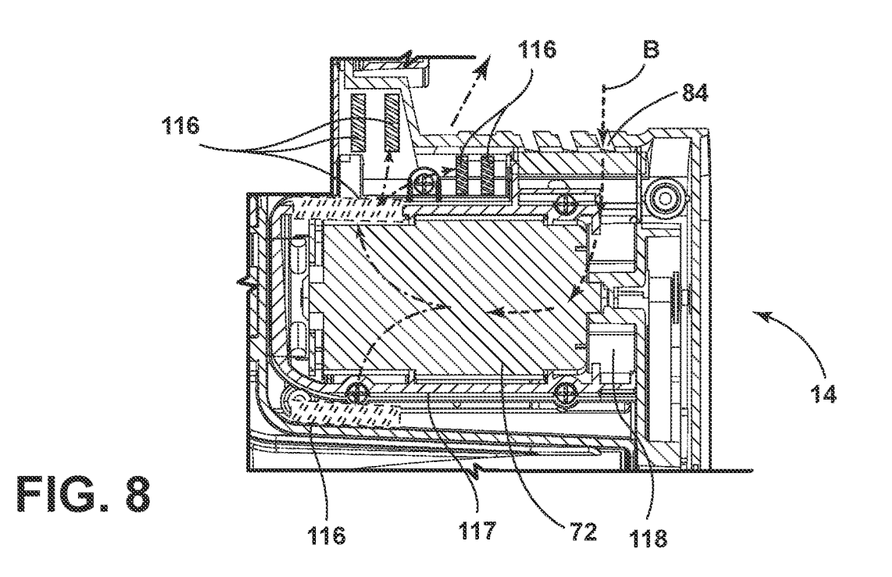
FIG. 8 is a sectional view of the base taken through line VIII-VIII of FIG. 7.

FIGS. 7-8 show another embodiment of the brush motor cooling air path B. In this embodiment, the brush motor cooling air path B is isolated from both the vacuum motor cooling flow path V and the working air flow path W. Instead of including a conduit that carries heated air from the brush motor 72 to the vacuum motor 58, the brush motor cooling air path B includes exhaust vents 116 in the base housing 64. The exhaust vents 116 can be provided on a top, rear, and/or bottom side of the base housing 64. Thus, the brush motor cooling air path B is limited to the base 14. Multiple vents 116 are shown in FIGS. 7-8, although it is understood that the number and location of the vents on the base housing 64 may vary. The vacuum motor cooling flow path V and the working air flow path W can be routed as previously described (see FIG. 5-6).

A motor housing 117 enclosing the brush motor 72 is positioned within the base 14, and may be formed by or separately from the base housing 64. The motor housing 117 can enclose a cooling fan 118. The cooling fan 118 is operably coupled with the brush motor 72 and draws cooling air through the brush motor cooling air path B.

Figure 9:
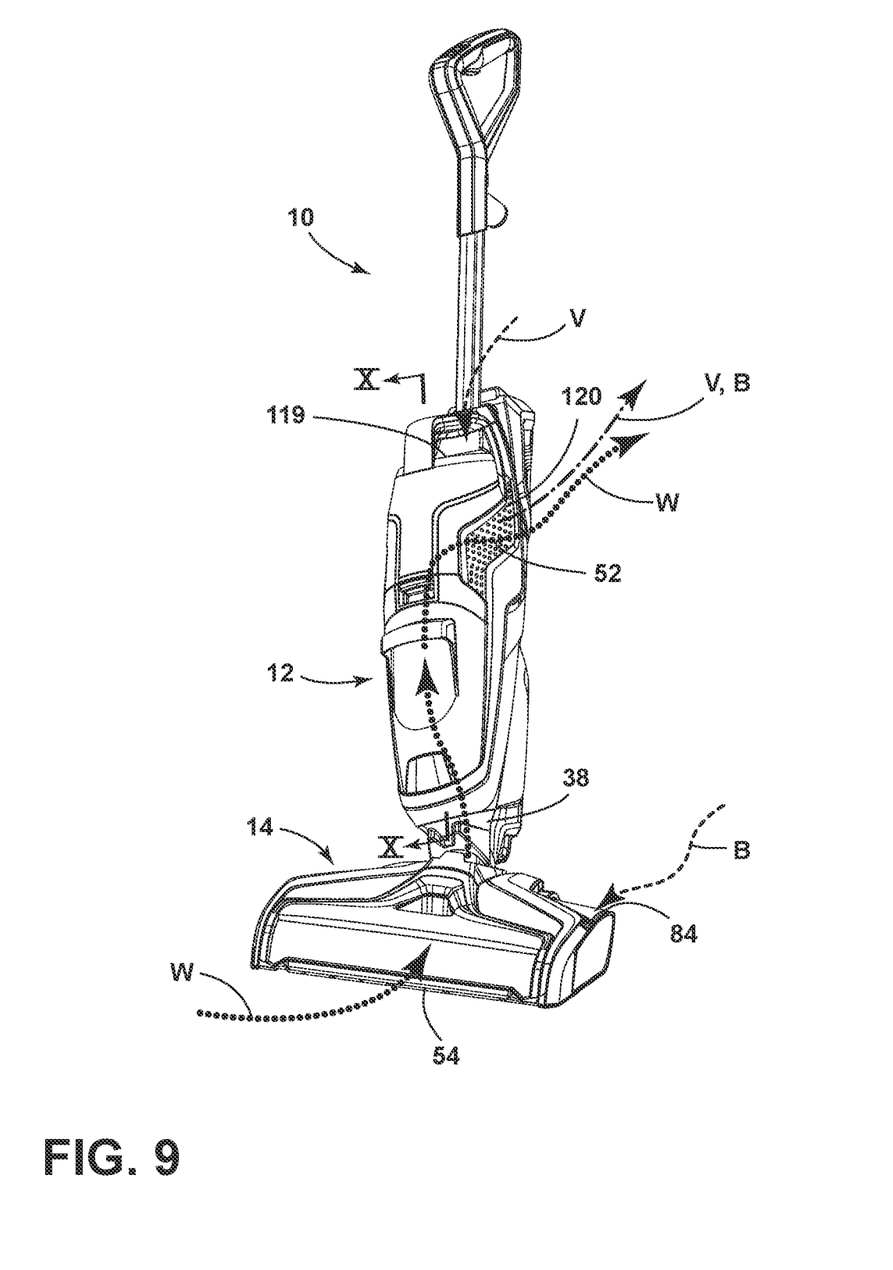
FIG. 9 is a perspective view of the surface cleaning apparatus showing an alternate embodiment of flow pathways for brush motor cooling air and vacuum motor cooling air.
Figure 10:
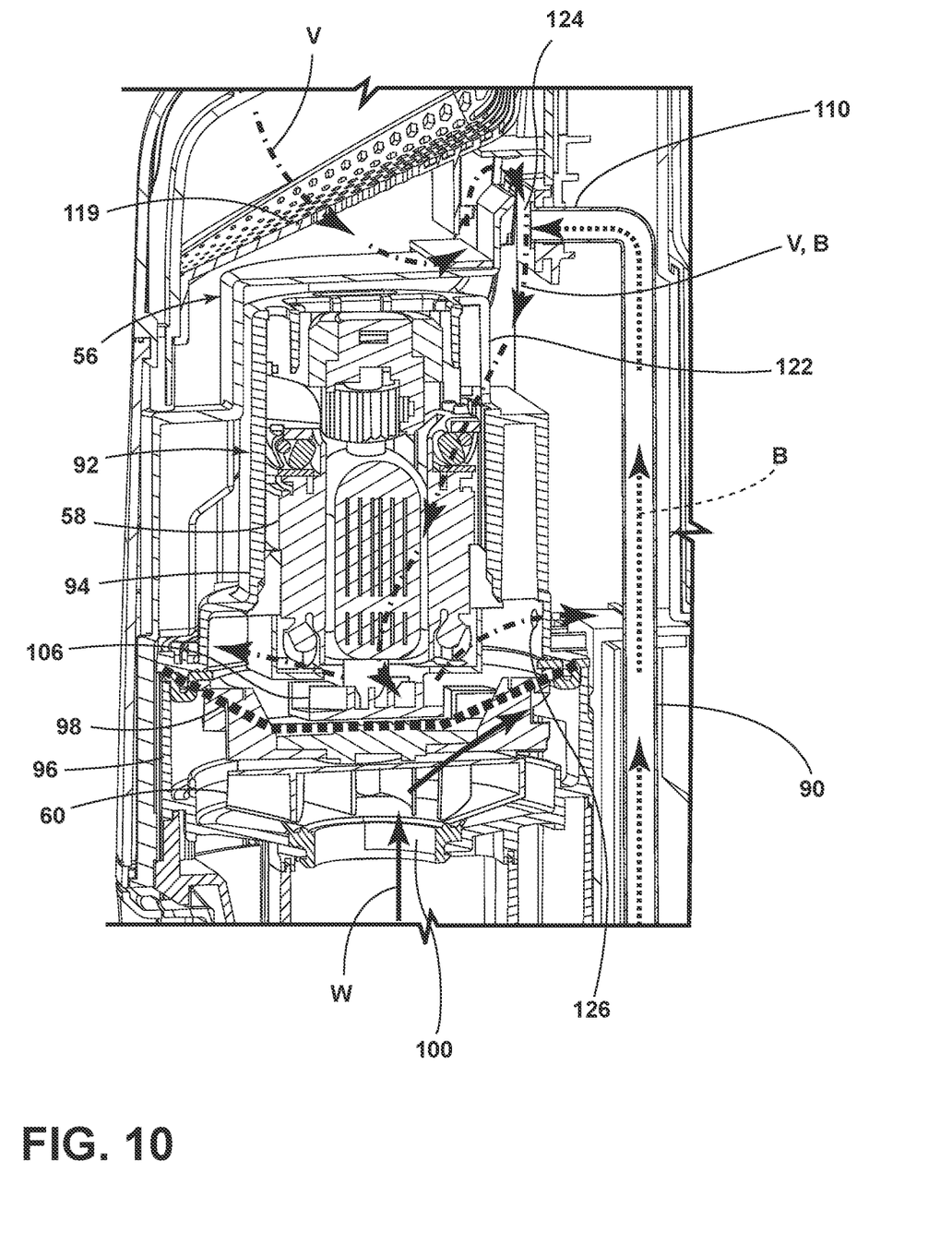
FIG. 10 is an enlarged cross-sectional view taken through line X-X of FIG. 9, showing portions of a motor cooling air path of the apparatus.

FIGS. 9-10 show another embodiment of the vacuum motor cooling air path V brush motor cooling air path B. The working air flow path W can be routed as previously described (see FIG. 5-6). In this embodiment, the vacuum motor cooling air path V generally flows in a reverse direction from the first embodiment, and has a cooling air inlet 119 formed by a vent in the upright body 12, such as by a vent on an upper side of the frame 18 and has a cooling air outlet 120. Like the first embodiment, brush motor cooling air can flow in through cooling air inlet 84, merges with the vacuum motor cooling flow path V in the upright body 12, and shares a common cooling air outlet 120. In some embodiments, the cooling air outlet 120 can be formed by more than one vent in the upright body 12, such as by vents on opposing sides of the frame 18.

The motor housing 94 includes at least one motor intake 122 for allowing cooling air for the vacuum motor 58 to be drawn into the housing 94 by the cooling fan 106. The motor intake 122 is in fluid communication with the cooling air inlet 119, such as via a cooling air inlet duct 124.

The brush motor cooling flow path B can merge with the vacuum motor cooling flow path V in the upright body 12 and share a common cooling air outlet 120, as well as a common cooling fan 106. In this embodiment, the outlet end 110 of the conduit 90 fluidly couples with the cooling air inlet duct 124 upstream of the motor intake 122. Through this connection, the brush motor cooling flow path B can join the vacuum motor cooling air path V within the enclosure 92.

From the intake 122, motor cooling air passes flows over the vacuum motor 58. The cooling air includes a mixture of cool, ambient air drawn in through the cooling air inlet 119 and heated air that has already flowed over the brush motor 72. Heat from the vacuum motor 58 transfers to the motor cooling air. The motor housing 94 also includes at least one motor exhaust opening 126 through which heated cooling air is exhausted. The exhaust opening 124 is in fluid communication with the common cooling air outlet 120 to exhaust heated motor cooling air from the apparatus 10.

To the extent not already described, the different features and structures of the various embodiments of the invention, may be used in combination with each other as desired, or may be used separately. That one surface cleaning apparatus is illustrated herein as having all of these features does not mean that all of these features must be used in combination, but rather done so here for brevity of description. Furthermore, while the surface cleaning apparatus 10 shown herein has an upright configuration, the surface cleaning apparatus can be configured as a canister or portable unit. For example, in a canister arrangement, foot components such as the suction nozzle and brushroll can be provided on a cleaning head coupled with a canister unit. Still further, the surface cleaning apparatus can additionally have steam delivery capability. Thus, the various features of the different embodiments may be mixed and matched in various vacuum cleaner configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A surface cleaning apparatus, comprising:
 a housing comprising a recovery pathway having a dirty inlet and a clean air outlet;
 a suction source comprising a vacuum motor in fluid communication with the dirty inlet;
 a motor housing enclosing the vacuum motor;
 a vacuum motor cooling pathway comprising a first cooling air inlet in fluid communication with ambient air outside the housing and a cooling air outlet, wherein the vacuum motor cooling pathway passes through the motor housing;
 a brush motor;
 a brushroll operably coupled to and driven by the brush motor; and
 a brush motor cooling pathway comprising a second cooling air inlet in fluid communication with ambient air outside the housing;

wherein the brush motor cooling pathway merges with the vacuum motor cooling pathway before the vacuum motor cooling pathway exits the motor housing, such that heated cooling air from the brush motor and the vacuum motor is exhausted together through the cooling air outlet; and wherein the brush motor cooling pathway is isolated from the recovery pathway.

2. The surface cleaning apparatus of claim 1, comprising a seal isolating the recovery pathway from the brush motor cooling pathway.

3. The surface cleaning apparatus of claim 2, wherein the suction source is arranged within an enclosure that comprises the motor housing and a fan housing enclosing a vacuum fan, wherein the seal is provided between the motor housing and the fan housing.

4. The surface cleaning apparatus of claim 3, wherein the seal defines a motor-side of the enclosure and a fan-side of the enclosure, and wherein the brush motor cooling pathway merges with the vacuum motor cooling pathway on the motor-side of the enclosure.

5. The surface cleaning apparatus of claim 3, wherein the suction source comprises a cooling fan operably coupled with the vacuum motor and configured to draw cooling air through the vacuum motor cooling pathway and through the brush motor cooling pathway, wherein the cooling fan is enclosed within the motor housing.

6. The surface cleaning apparatus of claim 1, wherein the suction source comprises:
a vacuum fan operably coupled with the vacuum motor and configured to draw working air through the recovery pathway; and
a cooling fan operably coupled with the vacuum motor and configured to draw cooling air through the vacuum motor cooling pathway and through the brush motor cooling pathway.

7. The surface cleaning apparatus of claim 1, wherein the brush motor cooling pathway comprises a conduit configured to carry heated air from the brush motor to the suction source, wherein the conduit is fluidly coupled to the motor housing.

8. The surface cleaning apparatus of claim 7, wherein the housing comprises a cleaning base and an upright body coupled with the cleaning base by a joint assembly configured to pivot about at least one axis, wherein the conduit extends through the joint assembly.

9. The surface cleaning apparatus of claim 1, wherein the housing comprises an upright body and a cleaning base coupled with the upright body and adapted for movement across a surface to be cleaned.

10. The surface cleaning apparatus of claim 9, wherein the second cooling air inlet is disposed on the cleaning base and the cooling air outlet is disposed on the upright body.

11. The surface cleaning apparatus of claim 10, wherein the first cooling air inlet is disposed on the upright body.

12. The surface cleaning apparatus of claim 1, wherein the surface cleaning apparatus is multi-surface wet/dry vacuum cleaner configured to clean hard floor surfaces and soft floor surfaces.

13. The surface cleaning apparatus of claim 1, comprising a recovery tank defining a portion of the recovery pathway, wherein the recovery tank is removably mounted on the housing.

14. The surface cleaning apparatus of claim 1, comprising a suction nozzle defining the dirty inlet, wherein the brushroll is disposed in the recovery pathway at the suction nozzle.

15. The surface cleaning apparatus of claim 1, comprising a fluid delivery system including a fluid delivery pathway, a supply tank, and a fluid distributor in fluid communication with the supply tank via the fluid delivery pathway, wherein the fluid distributor is configured to dispense cleaning fluid to at least one of the brushroll and a surface to be cleaned.

16. The surface cleaning apparatus claim 1, comprising:
a first cooling fan operably coupled with the brush motor and configured to move cooling air through the brush motor cooling pathway;
a second cooling fan operably coupled with the vacuum motor and configured to move cooling air through the vacuum motor cooling pathway; and
a vacuum fan operably coupled with the vacuum motor and configured to move working air through the recovery pathway.

17. The surface cleaning apparatus claim 1, wherein the brush motor cooling pathway merges with the vacuum motor cooling pathway at the motor housing.

18. The surface cleaning apparatus claim 1, wherein the brush motor cooling pathway merges with the vacuum motor cooling pathway before the vacuum motor cooling pathway enters the motor housing.

19. A surface cleaning apparatus, comprising:
a housing comprising a recovery pathway having a dirty inlet and a clean air outlet;
a suction source comprising a first motor in fluid communication with the dirty inlet;
a motor housing enclosing the first motor;
a first motor cooling pathway comprising a first cooling air inlet in fluid communication with ambient air outside the housing and a cooling air outlet, wherein the first motor cooling pathway passes through the motor housing;
a second motor; and
a second motor cooling pathway comprising a second cooling air inlet in fluid communication with ambient air outside the housing;
wherein the second motor cooling pathway merges with the first motor cooling pathway before the first motor cooling pathway exits the motor housing, such that heated cooling air from the first and second motors is exhausted together through the cooling air outlet; and
wherein the second motor cooling pathway is isolated from the recovery pathway.

20. The surface cleaning apparatus of claim 19, comprising a seal isolating the recovery pathway from the second motor cooling pathway.

21. The surface cleaning apparatus of claim 20, wherein:
the suction source is arranged within an enclosure that comprises the motor housing and a fan housing enclosing a fan;
the seal is provided between the motor housing and the fan housing to define a motor-side of the enclosure and a fan-side of the enclosure; and
the second motor cooling pathway merges with the first motor cooling pathway on the motor-side of the enclosure.

22. The surface cleaning apparatus of claim 19, wherein the suction source comprises:
a first fan operably coupled with the first motor and configured to draw working air through the recovery pathway; and
a second fan operably coupled with the first motor and configured to draw cooling air through the first and second motor cooling pathways.

23. The surface cleaning apparatus of claim 19, wherein the second motor cooling pathway comprises a conduit configured to carry heated air from the second motor to the suction source, wherein the conduit is fluidly coupled to the motor housing.

\* \* \* \* \*